C. ELLIS.
HYDROGENATED OR HARDENED OIL AND PROCESS OF MAKING SAME.
APPLICATION FILED NOV. 22, 1912.
1,097,308.
Patented May 19, 1914.
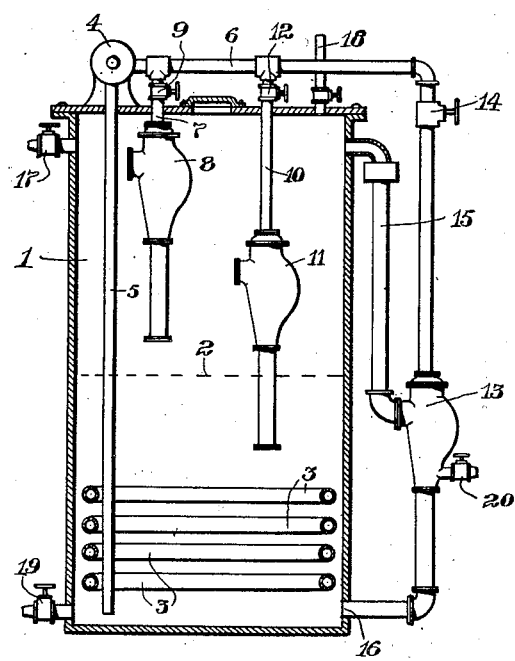
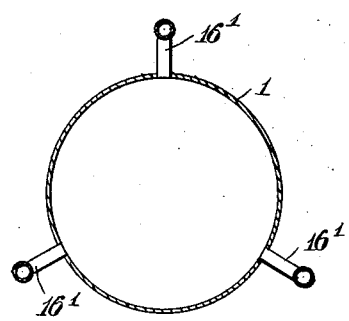
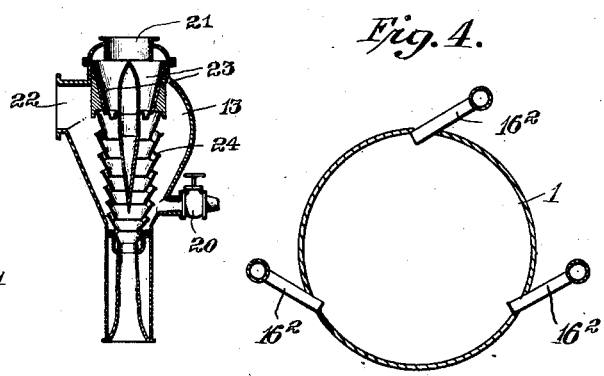
Attest:
Inventor:

UNITED STATES PATENT OFFICE.

CARLETON ELLIS, OF MONTCLAIR, NEW JERSEY.

HYDROGENATED OR HARDENED OIL AND PROCESS OF MAKING SAME.

1,097,308.  Specification of Letters Patent.  Patented May 19, 1914.

Application filed November 22, 1912. Serial No. 732,943.

*To all whom it may concern:*

Be it known that I, CARLETON ELLIS, a citizen of the United States, and a resident of Montclair, in the county of Essex and State of New Jersey, have invented certain new and useful Improvements in Hydrogenated or Hardened Oil and Processes of Making Same, of which the following is a specification.

This invention relates to edible fats and the like, comprising oil or fat, such as hydrogenated oil, hardened by catalytic action and particularly to mixtures of such fats or oils with other oils; all essentially or substantially free from toxic bodies including freedom from harmful or undesirable residual traces of catalytic bodies such as nickel or copper: all as more fully hereinafter described.

Some oils proposed or intended for edible purposes contain nitrogenous or other bodies of a deleterious or toxic character which may be destroyed by certain treatment as by certain conditions of hydrogenation without charging with metal poisons so that the oil or fat becomes safely edible and without cumulative and dangerous effects when taken in large quantities for protracted periods. For a high grade edible product a composition essentially or substantially free from the foregoing objectionable bodies is desired.

Among the vegetable oils corn, cottonseed, soy bean, peanut, sesame, olive, rape, cocoanut, castor and palm oils or animal oils such as those of lard and tallow and other oleins and palmitins with more or less stearins, of an animal nature, fish and whale oils, codliver oil and the like may be employed either in the hydrogenated or unhydrogenated condition in compounding products under the present invention.

In the hydrogenation of oils with the aid of nickel and copper catalyzer compounds and the like considerable difficulty exists because of the solution of some of the catalyzer by the oil. Although a substantially neutral oil be taken for hydrogenation, during the operation a certain small amount of fatty acid is liable to be set free, and at the temperatures employed the catalyzer passes more or less into solution as an oleate, palmitate, stearate etc. Thus the oil carries a body of toxic nature which may be present in an amount to exert a baneful effect as a cumulative or progressive poison. Under the present invention I may, for example, associate a catalyzer of this character with a nullifying agent, the purpose of which is to render the catalyzer metal resistant to the solvent action of free fatty acids. By this means a new product is secured namely, a catalytically-hydrogenated edible fat essentially or substantially free from toxic traces of nickel or other similar catalyzer-metal compounds.

One manner of carrying out the present invention is to prepare a catalyzer by admixing a concentrated solution of nickel nitrate with an equivalent amount (or excess) of quicklime or hydrated lime so as to form a compound of nickel hydrate and lime or more precisely, perhaps, a basic compound of nickel and lime nitrate, calcining this material, affording nickel oxid probably more or less in combination with calcium compounds. The material is then carefully reduced with hydrogen and is ready for use. During the operation of hydrogenating the oil, the active lime compound serves to satisfy the nascent fatty acid liberated, and thus the nickel is protected. Other protecting agents such as the oxids, hydrates, carbonates, etc., of calcium and magnesium likewise may be used. Thus there is obtained an edible oil product comprising an edible catalytically-hydrogenated fat entirely devoid of traces of nickel or of nickel in essentially toxic amounts.

Nickel in the metallic form generally speaking is not as soluble in glycerids as nickel oxid. If by the action of steam due to reduction of the carbonyl group or otherwise, the glycerid is hydrolized the fatty acids attack nickel oxid, but do not tend as readily to dissolve metallic nickel owing to the mass action of the hydrogen gas. Dry hydrogen preferably should be employed in treating the oil even under these conditions, but the gas should not be under excessive pressures. It is somewhat easier to harden certain oils by using a high pressure of hydrogen, but this may be compensated for by employing a highly responsive catalyzer.

Regenerated nickel catalytic material may be used to advantage in edible fat manufacture. To this end the spent catalyzer may be washed with naphtha to remove most of the adhering fat and to further purify it may be heated in an atmosphere of oxygen or ozonized oxygen until free from benzol insoluble organic compounds and then reduced in an atmosphere of hydrogen preferably under a pressure of 4 or 5 atmospheres or so which enables the reaction to take place effectively without running up the temperature to a point where high sensitivity is lost. Further, in reference to making catalyzer for the purposes aforesaid, it should be stated that nickel sulfate may be used instead of nickel nitrate mentioned above. If nickel sulfate is mixed with slaked lime nickel, hydrate and calcium sulfate are produced. This mixture may be dried and ignited in hydrogen. The dried material is ignited in a current of hydrogen or other suitable reducing gas when it is ready for use as a catalyzer. Similarly, other nickel salts such as nickel fluosilicate may be mixed with lime or other base to effect the required metathesis. Ordinarily, however, I prefer to secure a product of a consistency expressed as the solidifying point of said product of a range approximately from above 15° C. to below 35° C. It, of course, may vary within still greater limits according to climate and seasonal variations of atmospheric temperature. In general a product having a titer of from 25° C. to 28° C. is well suited as lard substitute of lard compound. It should be noted that the term titer as herein employed is that not rigidly precise thermometric value derived by cooling some of the melted product (not the fatty acids) and taking the point where the falling thermometric column becomes stationary which is that point where solidification takes place. The titer of the fat is usually lower than the melting point.

For the manufacture of butter substitutes other conditions obtain. A softer product is desired, one in particular which when taken into the mouth immediately melts and does not leave a disagreeable greasy sensation on the tongue and walls of the mouth. In the manufacture of hydrogenated butter substitute as I have set forth in U. S. Letters Patent No. 1,038,545 of Sept. 17, 1912, the step of over or super-hydrogenation is desirable. In the above mentioned patent I have specified in particular the manufacture of a butter substitute involving the incorporation of hydrogenated edible oil and milk material. It is also possible to make a butter-like composition without the use of milk material, but consisting of simply edible hydrogenated oil with perhaps some flavoring material as valerian ester and the like, salt and coloring matter. The mixture of edible hydrogenated vegetable oil with ordinary butter in a proportion of two parts of the oil to one part of the butter provides very suitable butter-like material at a relatively low cost. Hydrogenated corn oil, because of its flavor is desirable for use in this way. While the procedure of making an edible butter or lard-like compound varies somewhat depending upon the oils or fats treated and degrees of consistency desired, etc., for illustrative purposes, an edible mixture is prepared by taking cottonseed oil and corn oil in the proportion of 4 parts of the former to one part of the latter. The almost tasteless character of cottonseed oil when highly refined and also when somewhat hydrogenated is improved by the addition of corn or peanut oil giving the product sometimes a faintly nutty flavor. The mixture may be super-hydrogenated by the action of hydrogen in the presence of a catalyzer to a titer of 35° to 40° C. This is cooled and pressed to bring the product to a titer of say about 26° C. It is agitated and heated with 5% more or less of fullers' earth for about one hour and after filtration is ready for packaging. Or the pressed super-hydrogenated cottonseed oil product obtained in this way may be mixed with about 15% or 20% of corn oil to secure the titer desired.

Wherever the terms oils and fat have been used herein, they are applied as is common in this art in a sense which is substantially synonymous.

In the case of oils containing considerable quantities of fatty acids, I prefer to distil these with steam under reduced atmospheric pressure, to remove the deleterious acid material, leaving the fatty mixed esters in substantially pure condition and in a form readily susceptible to the action of hydrogen.

By the present invention cocoanut oil may be used and may be hydrogenated or not according to circumstances. Hydrogenated cocoanut oil alone or ordinary refined cocoanut oil mixed with hydrogenated cottonseed, corn or peanut oil and the like may be used as a fluxing agent for chocolate in manufacture of confectionery. The melting point of the fatty flux should preferably be about 90° F. to 100° F. Hydrogenated unpressed cocoanut oil or hydrogenated cocoanut oil olein or stearin may be used in a similar manner.

The manufacture of the coating of chocolate creams calls for a relatively high melting point fat which incorporates readily with chocolate and does not impair the flavor thereof. Cocoa butter is especially desired on this account, but is relatively expensive. Cocoanut oil melts so easily that in hot weather candies made with it melt very quickly when handled. Cocoanut oil has also a tendency to rancidify.

In the manufacture of butter substitutes using cottonseed oil it is desirable to hydrogenate until the iodin number falls to 80° or thereabout. The oil may then be cooled to about 30° C. or so, and allowed to stand for a time and pressed to remove the excess of stearin. It is then melted or warmed to render it entirely fluid, and is incorporated with milk material. Suitable material of this character is ordinary full milk or skim milk or butter milk, sterilized milk, sour milk which has been specially fermented using lactic acid ferment and the like. Salt to the extent of 2% to 8% or thereabout, may be added according to the degree of saltiness desired. Suitable coloring material such as ordinary butter color, and also flavoring compounds, may be likewise added. Of the oils mentioned cottonseed and peanut oil are especially suitable, while corn and soy bean oil also are adapted for use in this way. Various other oils may also be incorporated if desired, such as lard and tallow oil, almond oil, olive oil, rape seed oil, cocoanut oil and the like may be added in various proportions, although in general it should be stated that the product essentially or preferably should consist of vegetable oil. If oils other than those set forth as preferable in the present invention are employed, it is desirable also to hydrogenate these to improve their odor. Cocoanut oil here is not generally speaking desirable, because of the fact that it has a tendency to become rancid in the presence of moisture. The flavor of cocoanut oil is, however, desirable and this may be used more or less, particularly if somewhat hydrogenated, or if substantially free of moisture. With less than 5% moisture a refined oil remains neutral for some time.

A "dry" butter substitute of about the melting point of butter may be made by compounding 12 parts soft hydrogenated cottonseed oil; 3 parts of refined cocoanut oil and $3\frac{1}{2}$ parts of good palm oil. Or, 6 parts hydrogenated cottonseed oil and 6 parts or more of cocoanut oil may be mixed and heated to 212° F. or so to remove moisture.

Palm oil when freed from undesirable excess of free fatty acids and then hydrogenated, forms a desirable blending fat for butter substitutes. It mixes with hydrogenated cottonseed oil without "seeding" on standing, that is, does not granulate and separate in an undesirable way. While raw palm oil is rather unpalatable, the refined hydrogenated product is adapted for use as an edible oil. A palm oil butter substitute containing milk material may be prepared by substituting this oil, refined and preferably hydrogenated, in the above milk-containing formulas.

A substantially dry butter substitute may be made from hydrogenated cottonseed oil 15 parts; palm oil 4 parts; and butter fat 1 part; with which may be incorporated salt and special flavoring agents.

Hydrogenated fish or whale oil similarly may be used as a basis of moisture-containing or dry butter substitutes and other edible products. Before treating crude oil of this character with hydrogen, it preferably should be washed with dilute alkali to remove free fatty acids. In the treatment of fish oil, whale oil and the like, a mixed catalyzer consisting of either nickel and cobalt in the metallic condition is recommended. Hydrogenation progresses somewhat more easily with neutral oils than with those containing large amounts of free fatty acids and there is less likelihood that metal will be dissolved from the catalyzer by the oil when the latter is neutral.

Purification of the oil in the manner described in Serial No. 694,953 filed May 3, 1912, and Serial No. 693,219 filed April 25, 1912, or otherwise may therefore, if desired, precede the step of hydrogenation. It should be stated, however, that with some fats at least stability is in part dependent on the amount of handling the fat has experienced. Minimizing the handling lends to stability in flavor in some cases. The treating receptacles in which hydrogenation is carried on preferably should be lined with enamel.

The super-hydrogenation of fish oil converts the esters of the series of fatty acids $C_nH_{2n-8}O_2$ into comparatively odorless saturated compounds. Glyceryl clupanodonate, a body largely responsible for the disagreeable odor of fish oil, is converted into the stearate and the latter may be removed more or less by pressing or otherwise. The resinous substances apparently formed by the oxidation of clupanodonic acid, when fish oil is exposed to the air for a considerable period, are not as easily eliminated by hydrogenation and their presence in quantity is not conducive to effective action of some catalyzers. When present in any material proportion the oil should be washed with an alkaline solution prior to hydrogenation.

The accompanying diagrammatic drawings show, mainly in section, apparatus in accordance with the present invention whereby the product of the invention may be prepared to good advantage.

In the drawings Figure 1 is a vertical section of a receptacle fitted with inductors. Fig. 2 is a detail section of an inductor, while Figs. 3 and 4 are horizontal sections of receptacles showing different arrangements of inductor inlets.

In Fig. 1, 1 is a receptacle which is filled with oil to the level shown by the dotted line 2. 3 is a heating coil and 4 is a pump or circulatory means having suction pipe 5 extending to nearly the bottom of the receptacle 1. The discharge outlet from the pump 4 is connected with pipe 6 to which is attached an inductor, of which three are shown in the present illustration, these being 8, 11 and 13, controlled by the valves 13c 9, 12 and 14. The inductor 8 is situated in the upper part of the receptacle. The inductor 11 depends into the oil. The inductor 13, discharges into the bottom of the receptacle. In the latter case a pipe 15 communicates with the upper part of the receptacle. 17 is an inlet for oil or catalyzer and 19 is a draw-off valve.

In Fig. 2 the inductor is shown in detail, 21 being the oil inlet; 22 a gas inlet; 23 a series of nozzles and 24 multiple stage induction effect. 20 is a valve for testing inductive force, or for the admission of gas.

Fig. 3 shows three inductors arranged at angles of 120° from one another, the admission of the oil being radical.

Fig. 4 shows a substantially tangential admission of oil, two members operating in opposition to a third member.

The operation of this apparatus is as follows: Oil is placed in the receptacle 1 and catalyzer is added, this catalyzer being preferably finely-divided reduced nickel with a lime protective agent or equivalent material and when the oil has reached the required temperature of say 150° to 160° C., more or less, the pump 4 is put into operation and oil mingled with finely-divided catalyzer is drawn from the bottom of the receptacle and passed into the distributing pipe 6.

When the valve 9 is opened the oil passes from the inductor 8 and discharges above the level of the oil 2. The space above the oil is filled with hydrogen gas or any suitable hydrogen-containing gas and by the inductive action of the jets produced by the nozzle 23, gas is drawn into the inductor at 22 and mingles with the oil discharging above the level of the body of the oil 2.

In the case of the inductor 11, the oil and gas discharge beneath the oil level and the gas bubbles through the body of the oil. In the case of the inductor 13, which by the way may be set at any suitable height with respect to the receptacle 1, hydrogen gas is introduced from the pipe 15 and the mixture of oil and gas in a thoroughly commingled condition discharges into the body of the oil in the receptacle.

In Figs. 3 and 4 the duplication of inductors such as are shown at 13 provides for a very satisfactory distribution of the gas through the oil. It should be stated that the apparatus may be operated by the means of a single inductor, such for example, as that shown by the type 8, or that shown by 11, or 13. Hydrogen gas is supplied as required during the operation and the treated oil is withdrawn at 19. Before doing this it is, however, desirable to allow the catalyzer to settle and draw off clear oil as far as possible. To this end the draw-off 19 is set a suitable distance above the bottom of the tank in order to afford a deposition pocket for the catalyzer. It is not, of course, usually possible to retain all the catalyzer in this manner, especially when it is in a very finely-divided condition.

A fat composition of lard-like consistency may be made by mixing hydrogenated oil of a high titer and free from toxic traces of catalyzer with deodorized cottonseed oil. To this end I hydrogenate cottonseed oil to a fatty titer of say 52 and suitably mix with refined deodorized cottonseed oil. A relatively small proportion of the 52 titer fat suffices for making the product aforesaid. The entire mixture may be deodorized by treating with super-heated steam at a temperature of about 400° F., and under a vacuum of about 28 to 29 inches of mercury.

To recapitulate, my invention relates to butter or lard substitutes or compounds or other edible fats and the like or products intended for the preparation of edible fats; comprising such products essentially or substantially free from toxic bodies including catalyzer material of the nature of nickel or copper or similar active metals whose oxids rather easily dissolve in heated oil, especially when the latter contains fatty acids either originally present or formed during the hydrogenating process; which products may be obtained, for example, by incorporating with the catalyzer a body capable of restraining or preventing solution of the catalytic material in the oil or fat, by using and maintaining the catalyzer essentially in a metallic state, by using dry hydrogen, and by avoiding excessive gas pressures.

What I claim is:

1. An edible oil product comprising edible composite fatty hydrogenated material essentially free from heavy metal toxic compounds.

2. An edible oil product comprising edible composite fatty hydrogenated material essentially free from catalytic metal compounds.

3. An edible oil product comprising edible composite fatty hydrogenated material of at least butter-like consistency essentially free from heavy metal compounds.

4. An edible oil product comprising edible composite fatty hydrogenated material of substantially lard-like consistency essentially free from catalytic metal compounds.

5. An edible oil product comprising catalytically-hardened edible cottonseed oil of substantially lard-like consistency free from dissolved metal catalyst.

6. The process of hydrogenating oily material to form non-toxic edible fats which comprises treating said material with hydrogen in the presence of an all-metal catalyzer and in maintaining said catalyzer in the metallic state during hydrogenation.

7. The process of hydrogenating oily material to form non-toxic edible fats which comprises treating said material with hydrogen in the presence of an all-nickel catalyzer and in maintaining said catalyzer in the metallic state during hydrogenation.

8. The process of hydrogenating oily material to form non-toxic edible fats which comprises treating said material with hydrogen in the presence of a metal catalyzer comprising nickel associated with a fatty acid neutralizing agent and in maintaining the active catalytic material in substantially a metallic state during hydrogenation.

Signed at Montclair, in the county of Essex and State of New Jersey this 21st day of November, A. D. 1912.

CARLETON ELLIS.

Witnesses:
B. M. ELLIS,
F. CAUBUTT.